J. W. HALSTEAD.
FODDER CUTTER.
APPLICATION FILED APR. 8, 1910.
993,243.
Patented May 23, 1911.
2 SHEETS—SHEET 2.
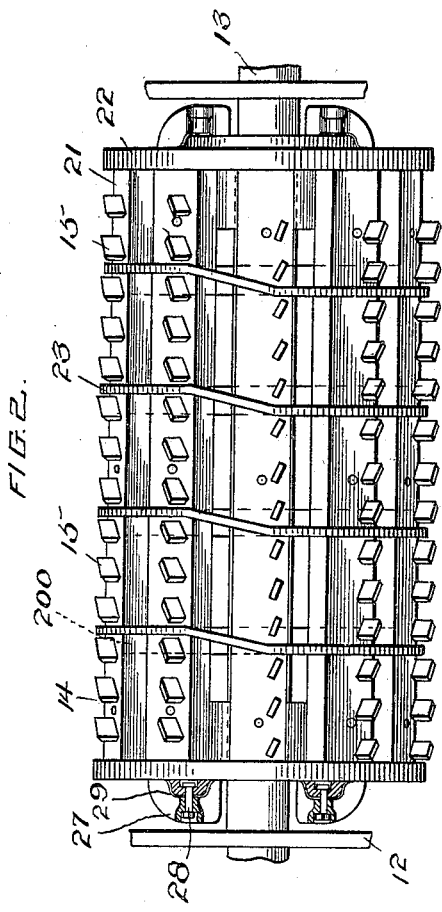
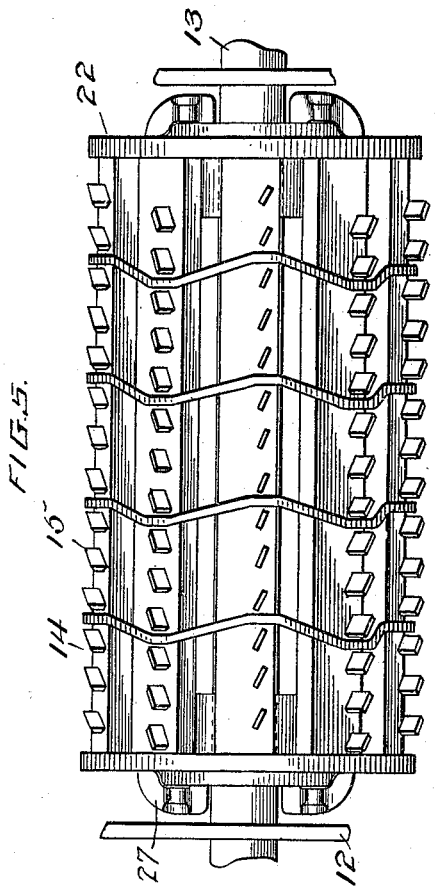
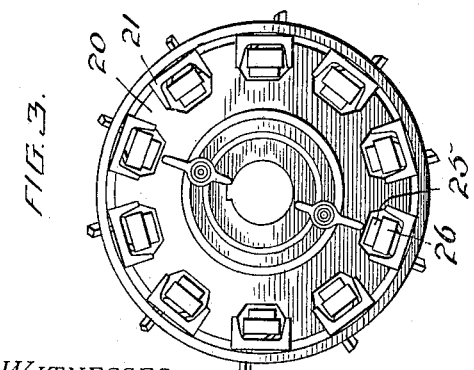
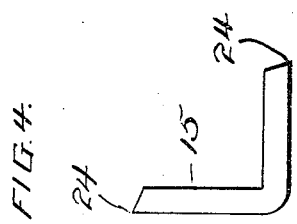
WITNESSES:
INVENTOR
John W. Halstead
BY
Attorneys

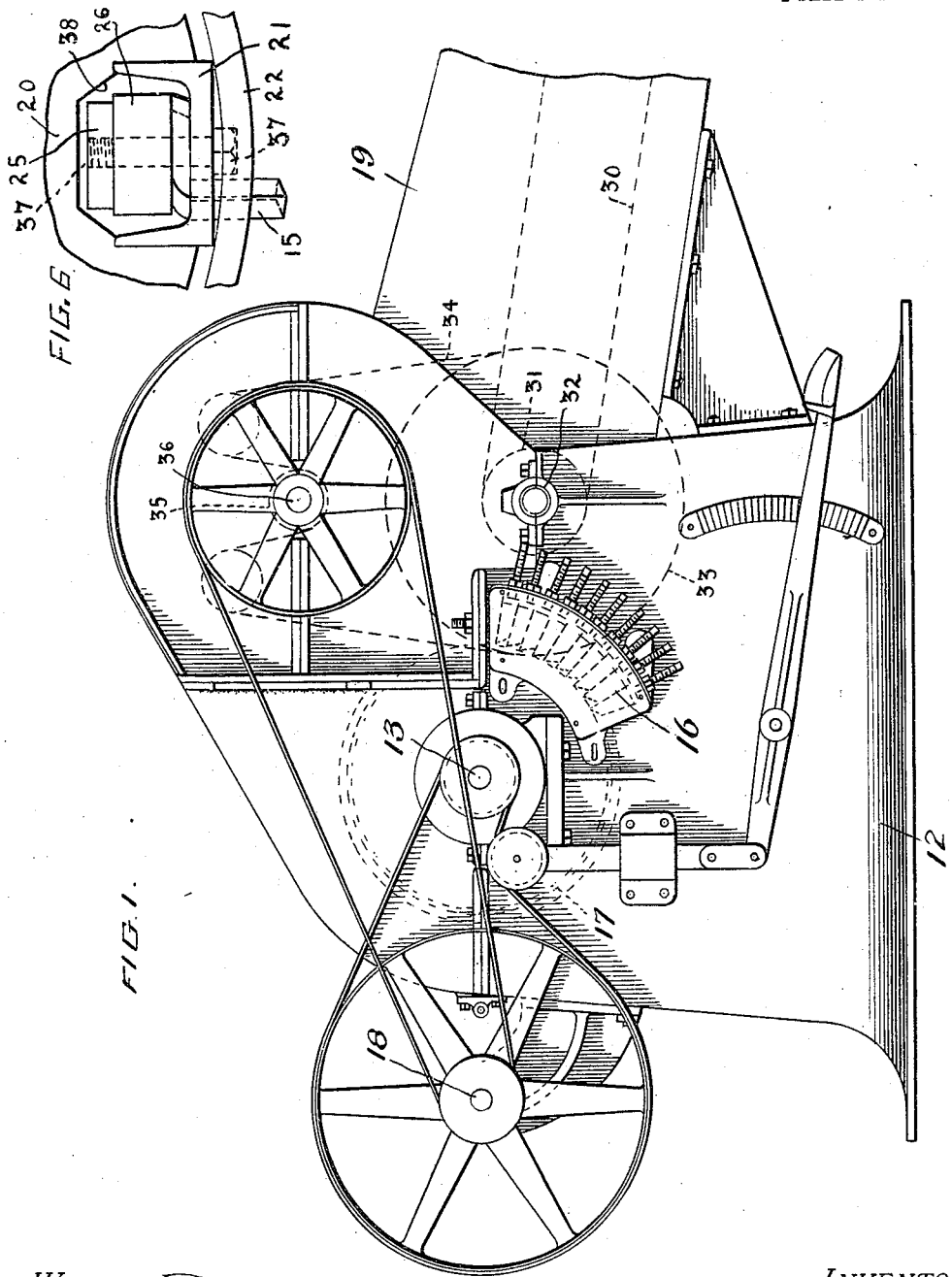

UNITED STATES PATENT OFFICE.

JOHN W. HALSTEAD, OF KANSAS CITY, MISSOURI, ASSIGNOR TO THE WOLF COMPANY, A CORPORATION OF PENNSYLVANIA.

FODDER-CUTTER.

993,243.      Specification of Letters Patent.      Patented May 23, 1911.

Application filed April 8, 1910. Serial No. 554,194.

*To all whom it may concern:*

Be it known that I, JOHN W. HALSTEAD, a citizen of the United States, residing at Kansas City, in the county of Jackson and State of Missouri, have invented or discovered certain new and useful Improvements in Fodder-Cutters, of which the following is a specification, reference being had therein to the accompanying drawings.

This invention relates to machines for cutting or comminuting straw, alfalfa or other fodder, of the type comprising a rotary cutter cylinder provided with a series of movable cutters coöperating with a set of fixed cutters, and has for its principal object to provide an improved cutter cylinder which is inexpensive of construction, reliable in operation, and convenient in use. This and other objects of the invention, together with means whereby the same may be carried into effect, will best be understood from the following description of certain forms or embodiments thereof shown in the accompanying drawings. It is to be understood, however, that the constructions described and shown have been chosen for illustrative purposes merely, and that the invention may be embodied in many other forms without departing from the spirit and scope thereof.

In said drawings Figure 1 is a side elevation of a machine constructed in accordance with the invention, a portion of the feeding or conveying mechanism being broken away. Fig. 2 is a side elevation, partly in section, of one form of cutter cylinder. Fig. 3 is an end view thereof. Fig. 4 is a detail of one of the cutters. Fig. 5 is a view similar to Fig. 2, showing a modified form of cutter cylinder. Fig. 6 is a view on an enlarged scale of certain parts shown in Fig. 3 showing the means for securing the cutters to the cutter bars, the end band being omitted in this figure.

The machine frame 12 is provided with bearings for a main shaft 13 on which is mounted a rotating cutter cylinder 14 provided with cutters 15 adapted to coöperate with one or more stationary cutters 16 suitably mounted on the machine frame. Partly surrounding the cutter cylinder beyond the stationary cutters is a suitable screen 17 shown in dotted lines in Fig. 1, said screen terminating at a suitable point to provide a feed opening through which the material is fed by suitable feeding mechanism driven from a countershaft 18. Said feeding mechanism may be of any suitable construction but preferably comprises a belt or chain conveyer 30 located in a trough 19 and driven by a pulley 31 on a shaft 32. As herein shown the shaft 32 is provided with a second pulley 33 driven by suitably arranged belting 34 from a pulley 35 on a second shaft 36, said last named shaft being driven through the countershaft 18 by suitable belting connecting said shafts 18 and 36 and other belting connecting said countershaft 18 with the main shaft 13, as shown.

The cutter cylinder as herein shown comprises a pair of webs 20, preferably disks, secured to said shaft 13 at a suitable distance from one another, and connected by a series of cutter bars 21 secured to the peripheries of said disks, or in recesses 38 formed therein, by bands 22, said bars being preferably arranged substantially parallel to the axis of said cylinder 14 or of the shaft 13, and being each provided with a plurality of cutters 15. In addition to the end webs 20 a suitable number of intermediate supporting webs 200 may, if desired, be employed.

The cutters 15 are arranged on the cutter bars 21 with their cutting edges disposed at an angle relatively to the cutting edges of the stationary cutter or cutters 16, whereby the cutters 15 and 16 coöperate, in the rotation of the cylinder, to produce a progressive shearing cut. This relative inclination of the cutters 15 and 16 is provided for preferably by arranging the cutters 16 with their edges substantially parallel to the axis of the cutter cylinder and the cutters 15 with their cutting edges at an angle to the length of the cutter bars 21, and consequently to said axis. The edges of the cutters 15 are preferably of a suitable length and arrangement to cause the edges of the cutters of one series to cover and fill the spaces, circumferentially of the cylinder, between the cutters of another series. To this end the cutters of the different series are staggered with respect to one another, as shown in Figs. 2 and 5. As shown in Fig. 5 the cutters of alternate series are so staggered, while in Fig. 2 there are shown a plurality of series of one arrangement, followed by a plurality of series of another arrangement. The cutting edges of the cutters of one series will preferably also be oppositely inclined to the axis of the cylinder from the cutting edges in another series.

For strengthening the cylinder and for preventing distortion or disruption thereof when rotated at a high speed there is provided one or more strengthening bands 23 intermediate the bands 22, said intermediate bands being distorted or bent to enable the same to pass between the staggered cutters of the several series.

Each of the cutters 15 preferably comprises an angular bar having two substantially similar arms disposed preferably substantially at right angles to one another, and each provided with a cutting edge 24. The cutter bars 21 are each provided with a series of properly disposed apertures through which either of the arms of one of the cutters 15 may project to that side of the bar at the exterior of the cylinder, the other arm having a bearing upon the side of said bar at the interior of said cylinder, by which arrangement each of the cutters 15 may be secured in place with either of its two cutting edges in operative position. The cutters 15 of each series are secured in operative position by a clamping bar 25 suitably secured, as by bolts 37, to the cutter bar 21, and between which and the cutters is preferably interposed a cushioning bar 26 of soft pine or other suitable material.

As will now be seen the construction above described provides means whereby the individual cutters 24 may be removed from the machine for sharpening or for other purposes without disassembling the machine or removing the cutter cylinder therefrom. Moreover the form of angular cutter shown and described may be tempered at its ends to provide a durable cutting edge without the necessity of tempering the same throughout its length, thereby permitting the same to bend instead of breaking when an obstacle is encountered, and said cutter may furthermore be sharpened as to both of its cutting edges at a single operation. The cushioning block 26 serves the double purpose of taking up any shock to which the cutters may be subjected and of acting as a compensating device to enable cutters of slightly varying thickness to be securely clamped in position.

Secured to the end webs 20 between the same and the frame are one or more lugs or wings 27 adjustably secured as by bolts 28 to annular flanges 29 formed on said disks 20. These lugs or wings serve the double purpose of balancing the cylinder 14 and of keeping clear the spaces between said cylinder and the frame from stock which might otherwise accumulate therein.

Having thus described my invention I claim and desire to secure by Letters Patent:

1. In a fodder cutter, in combination, a frame, a rotary cutter cylinder mounted in said frame, one or more lugs or wings interposed between the end of said cylinder and said frame, and means for adjustably securing said lugs or wings to the end of said cylinder.

2. In a fodder cutter, in combination, a frame, a rotary cutter cylinder mounted in said frame, one or more lugs or wings interposed between the end of said cylinder and said frame, an annular flange formed on the end of said cylinder, and means for adjustably securing said lugs or wings to said flange.

3. In a fodder cutter, a rotary cutter cylinder, a cutter having a pair of arms disposed at an angle to each other, and a cutting edge transverse to the plane of said angle at the extremity of each of said arms, and means whereby said cutter may be secured to said cylinder with either of said cutting edges in operative position.

4. In a fodder cutter, a cutter cylinder comprising a pair of webs, a plurality of cutter bars connecting and secured to said webs, said bars being provided with apertures, cutters having portions engaging the sides of said bars at the interior of said cylinder and portions provided with cutting edges projecting through said apertures, and means for clamping said cutters to said bars.

5. In a fodder cutter, a cutter cylinder, a cushioning member, a cutter having a portion received between said cushioning member and cylinder, and means for securing said member to said cylinder to clamp said portion therebetween, whereby said cutter is secured to said cylinder.

6. In a fodder cutter, a cutter cylinder comprising a plurality of cutter bars, a clamping bar corresponding to each of said cutter bars, a series of cutters carried by each of said cutter bars and each having a portion received between said clamping and cutter bars, a cushioning bar interposed between each of said clamping bars and the said portions of the corresponding cutters, and means for securing each of said clamping bars to the corresponding cutter bar to clamp said portions of the cutters between said cushioning and cutter bars, whereby said cutters are secured to said cylinder.

7. In a fodder cutter, a cutter cylinder, cutters having portions engaging the interior of said cylinder and portions provided with cutting edges extending to the exterior of said cylinder, means for clamping said first-named portions to the interior of said cylinder, and cushioning means interposed between said cutters and said clamping means.

8. In a fodder cutter, a rotary cutter cylinder, cutters having each a pair of arms disposed at an angle to each other and a cutting edge transverse to the plane of said angle at the extremity of each of said arms, one of the arms of each of said cutters engaging the interior of said cylinder and the other arm of each of said cutters extending to the exterior of said cylinder, and means for clamping said first named arms to the interior of said cylinder.

9. In a fodder cutter, a cutter cylinder comprising a pair of webs, a plurality of cutter bars connecting and secured to said webs, cutters having portions engaging the sides of said bars at the interior of said cylinder and portions provided with cutting edges extending to the sides of said bars at the exterior of said cylinder, bars for clamping said first-named portions to said cutter bars, and means for securing said clamping bars to said cutter bars.

In testimony whereof I affix my signature, in presence of two witnesses.

JOHN W. HALSTEAD.

Witnesses:
C. M. SWEENEY,
WALTER C. ENGLISH.

Copies of this patent may be obtained for five cents each, by addressing the "Commissioner of Patents, Washington, D. C."